United States Patent [19]
Truong et al.

[11] Patent Number: 5,943,917
[45] Date of Patent: Aug. 31, 1999

[54] THERMOSTAT HAVING A TEMPERATURE SETTING LEVER WITH TACTILELY DETERMINABLE POSITION

[75] Inventors: Kenny Truong, Roseville; Edward L. Schwarz, Minneapolis, both of Minn.

[73] Assignee: Honeywell Inc., Minneapolis, Minn.

[21] Appl. No.: 08/951,665

[22] Filed: Oct. 16, 1997

[51] Int. Cl.[6] ................................................ G06M 1/00
[52] U.S. Cl. .............................................. 74/527; 74/337
[58] Field of Search ........................................ 74/527, 337

[56] References Cited

U.S. PATENT DOCUMENTS

| | | | |
|---|---|---|---|
| 2,505,548 | 4/1950 | Hutt | 200/65 |
| 4,133,286 | 1/1979 | Linton . | |
| 4,267,744 | 5/1981 | Yamasaki . | |
| 4,301,438 | 11/1981 | McElroy | 337/339 |
| 4,455,886 | 6/1984 | Schmitt . | |
| 4,582,251 | 4/1986 | Odom et al. . | |
| 4,710,600 | 12/1987 | Sasaki et al. | 200/291 |
| 4,768,395 | 9/1988 | Tagawa . | |
| 4,906,115 | 3/1990 | Bischof . | |
| 5,224,649 | 7/1993 | Brown et al. . | |
| 5,303,612 | 4/1994 | Odom et al. . | |
| 5,339,705 | 8/1994 | Shirahama et al. | 74/475 |
| 5,537,893 | 7/1996 | Snider . | |
| 5,561,734 | 10/1996 | Simonsen et al. . | |
| 5,623,854 | 4/1997 | Snider . | |

*Primary Examiner*—Henry Bennett
*Assistant Examiner*—Marc Norman
*Attorney, Agent, or Firm*—Edward L. Schwarz

[57] ABSTRACT

A thermostat employing a lever for selecting the temperature setting has a detent mechanism for creating individual detent positions associated with temperature setting values. In a preferred embodiment the detent mechanism comprises ridges and valleys in the surface of the baseplate on which the thermostat elements are mounted. A projection on the setting lever engages the individual valleys to create the detent effect, and a edge of the cover cooperates with resiliency of the lever to deflect the lever so as to cause the projection on the lever to continually engage the ridges and valleys. Another embodiment has ridges and valleys on the edge of the cover which engage a first projection on the lever. A second projection slides along the baseplate surface and cooperates with resiliency of the lever to deflect the lever creating force urging the first projection into continual engagement with the ridges and valleys.

8 Claims, 3 Drawing Sheets

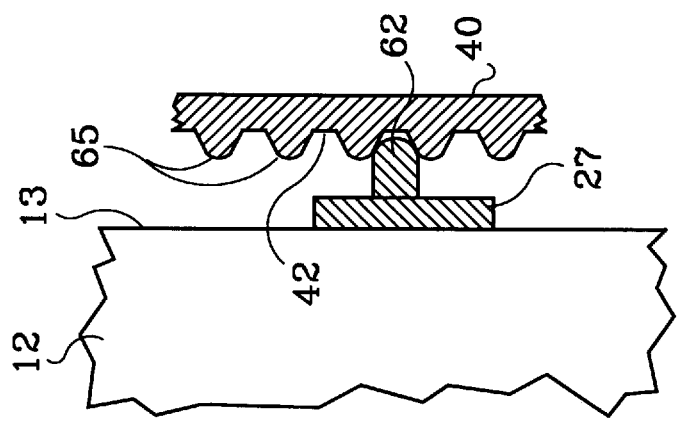
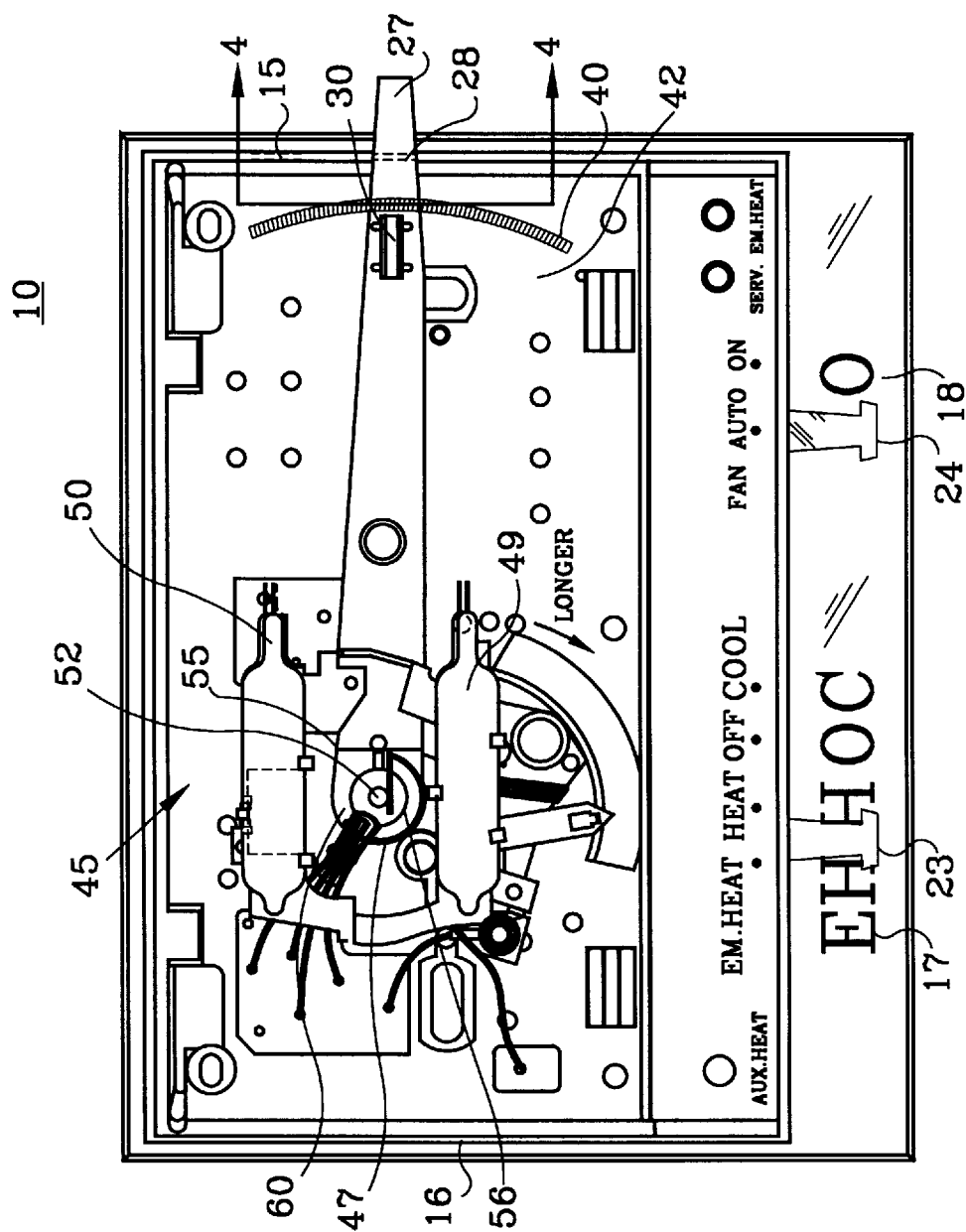

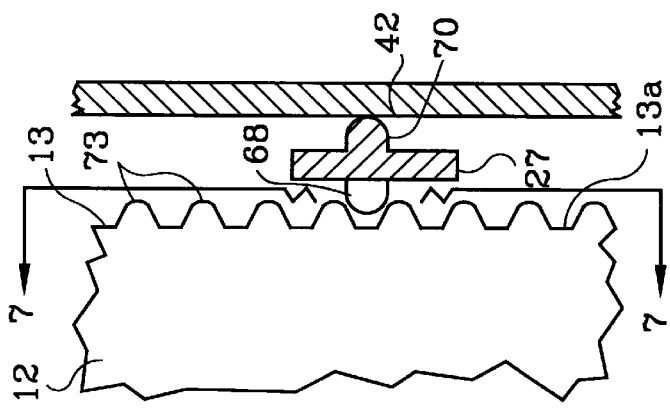
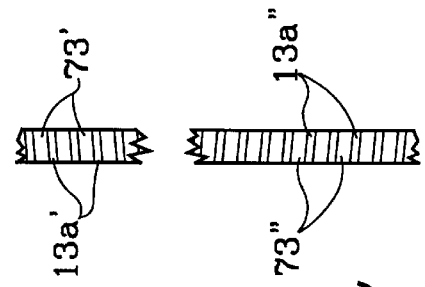
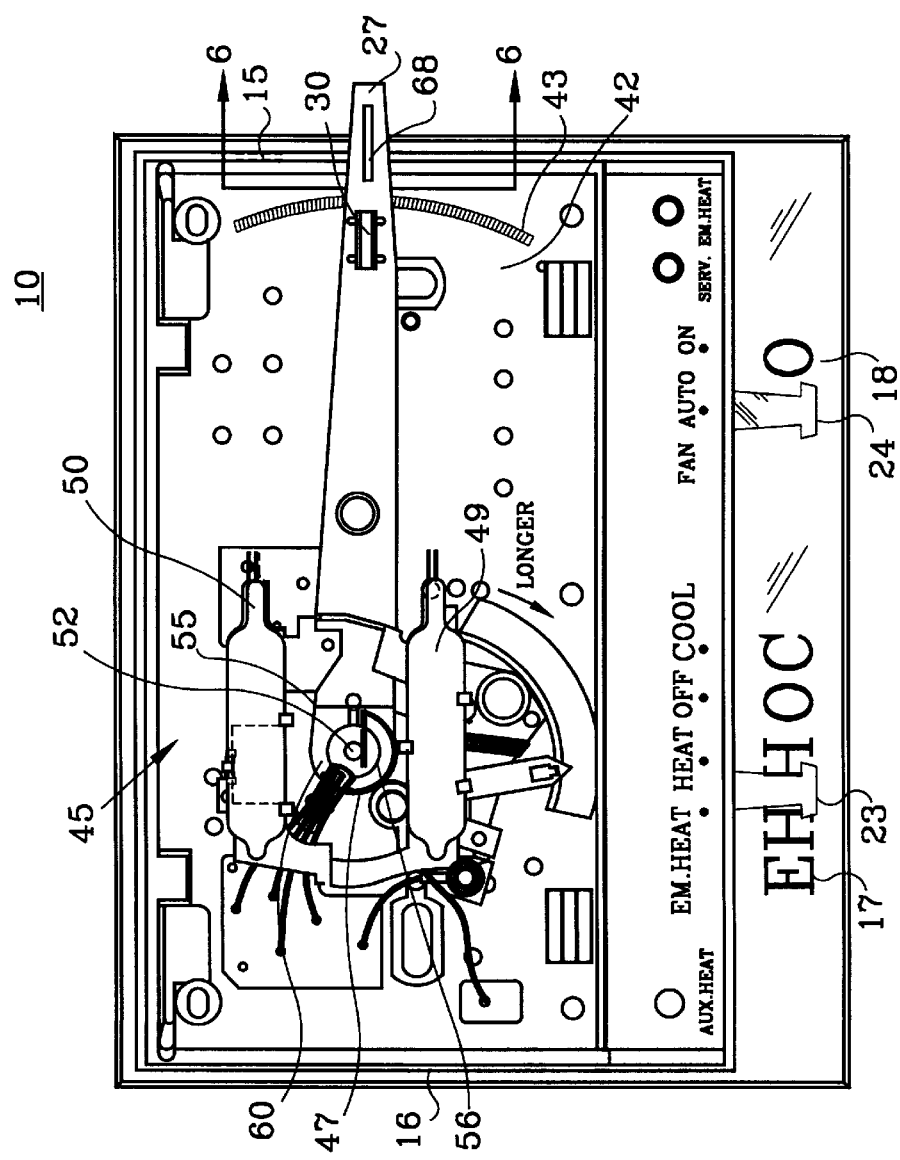
Fig. 6
Fig. 7
Fig. 5

THERMOSTAT HAVING A TEMPERATURE SETTING LEVER WITH TACTILELY DETERMINABLE POSITION

BACKGROUND OF THE INVENTION

Thermostats are universally present in dwellings and other temperature-controlled spaces. It is standard practice to mount them on a wall which will allow accurate control of the temperature within the space. They come in a variety of shapes and with a variety of functions. All thermostats do, however, share the feature of having some means for adjusting the temperature set point. The simple electromechanical thermostats typically have a bimetal coil with a free end whose angular orientation controls the temperature setting, typically by shifting the angle of a mercury bulb switch. In some designs, the bimetal coil orientation is controlled by rotating a knob, the famous Honeywell "ROUND" (registered US trademark) being only the most common of these. Thermostats with temperature setting knobs are usually but not always round. There is also another class of thermostats whose setting is lever-controlled. These are usually rectangular. One shape or the other may be preferred for no other reason than personal choice or greater compatibility with the decor of the room on whose wall the thermostat is mounted. It is true that it is easier to implement a larger number of auxiliary functions with a rectangular thermostat.

As one would expect for such a ubiquitous device, thermostats are used by people with a wide range of physical abilities including those with vision limitations. Such people find most common thermostats difficult to operate because the temperature setting is not discernible by them, resulting in a trial and error process to achieve a comfortable setting. One exception to this is the Honeywell ROUND®"Easy to Use" thermostat, which has an enlarged scale and knob to aid people with vision limitations. The adjustment mechanism also has a detent which makes it possible to set the thermostat by feel alone. Features of this thermostat are disclosed in U.S. Pat. Nos. 4,582,251 issued on Apr. 15, 1986 and 5,303,612 issued on Apr. 19, 1994, both to Odom et al.

There is a large demand for thermostats with these specialized features. This has led to the perceived need for a rectangular lever set thermostat which accommodates people with vision limitations.

BRIEF DESCRIPTION OF THE INVENTION

There is an existing design for a thermostat having a rectangular housing and a lever for selecting the temperature set point. For cost and market acceptance reasons it is useful to modify this existing design to incorporate the features described above for accommodating persons with vision impairments. Such a thermostat has a baseplate having a surface and carrying an adjustment lever having first and second ends and mounted for movement on the baseplate surface. The adjustment lever has a range of movement sweeping across a portion of the baseplate surface. A bimetal strip is attached to the lever adjacent to its first end.

The improvement comprises a projection extending from the lever toward the baseplate and sweeping along a preselected path on the baseplate surface during lever movement. A further feature of the improvement is the presence of a plurality of adjacent detent ridges on the baseplate surface in this path. Still another feature of the improvement is a lever bias element contacting the lever and urging the lever toward the baseplate surface and the lever's projection into contact with the detent ridges.

In a preferred embodiment, there is a cover which is a standard feature of these thermostats. The cover attaches to the baseplate and covers at least a portion of the lever. In the preferred embodiment at least a portion of the lever is resilient, and the lever bias element comprises a cover edge extending along the range of movement of the lever and in interfering contact with the lever. This edge resiliently deflects the lever to force the lever's projection into contact with the detent ridges.

In another embodiment, the ridges and valleys are carried on the edges of the cover, and a projection on the surface of the lever facing this edge, engages these ridges and valleys to create the detent action. A further projection facing toward the baseplate surface resiliently deflects the lever and urges the first projection into continual engagement with the ridges and valleys on the cover edge.

BRIEF DESCRIPTION OF THE DRAWINGS

FIG. 3 is a front projective view of a thermostat incorporating the invention with the cover removed so as to better show the invention.

FIG. 4 is a magnified cross section of a portion of FIG. 3 showing details of the invention.

FIG. 5 is a front projective view of a thermostat incorporating an alternative embodiment of the invention, and with the cover removed so as to better show the invention.

FIG. 6 is a magnified cross section of a portion of FIG. 5 showing details of the invention.

FIG. 7 is a view of the detents along the edge of the cover shown in FIGS. 5 and 6.

DESCRIPTION OF THE PREFERRED EMBODIMENT

Figure 1:
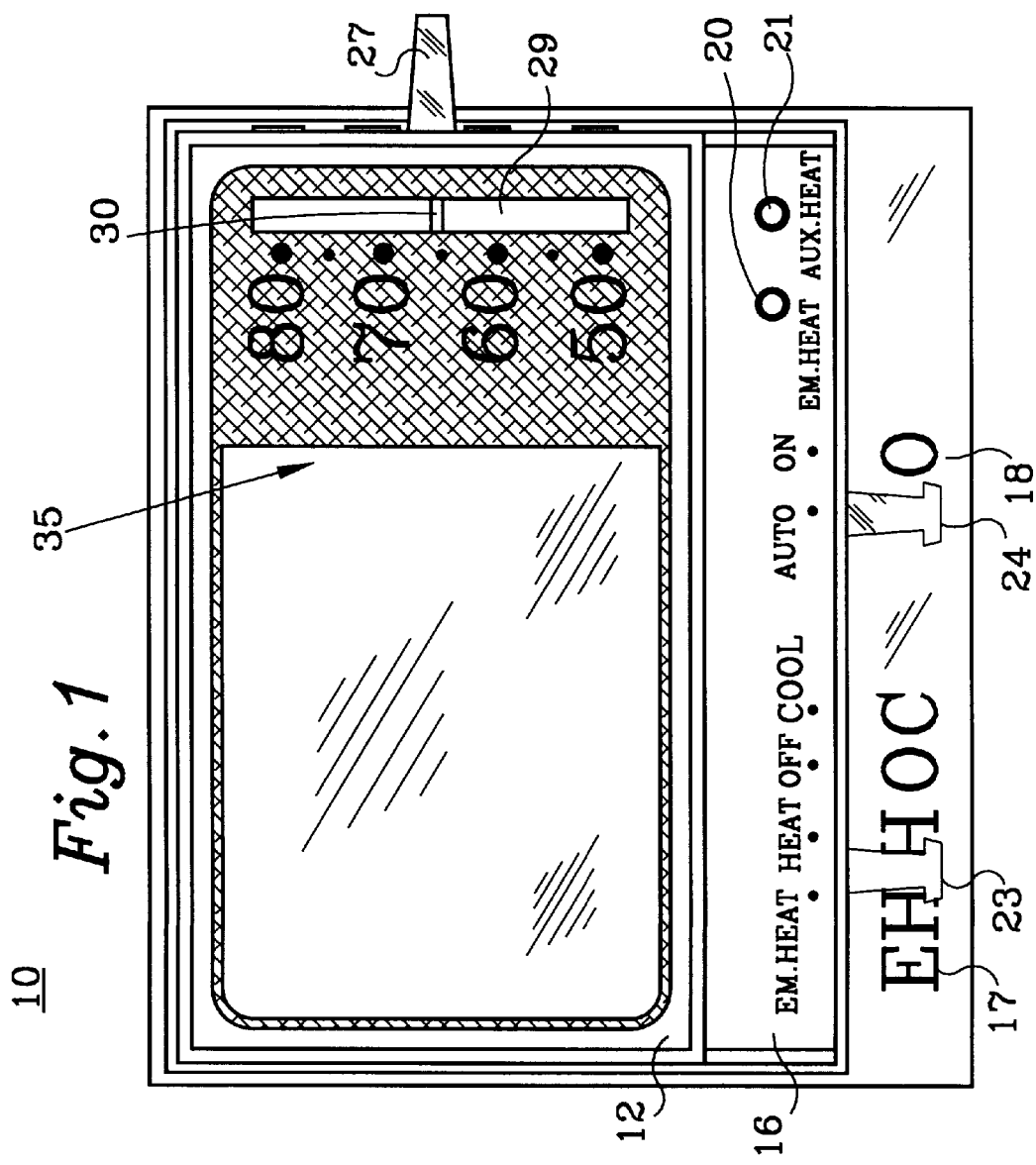
FIG. 1 is a front projective view of a thermostat incorporating the invention with the cover attached.

The frontal view of FIG. 1 shows the externally visible features of a typical thermostat 10 which incorporates the invention. A cover 12 covers the functional elements of thermostat 10. Cover 12 has a temperature setting scale 35 having unusually large temperature lettering to assist those with vision impairment to see the temperature setting. A setting lever 27 projects from the side of thermostat 10 and is used in conjunction with scale 35 to select the temperature set point. A setting window 29 runs the length of scale 35. A large setting indicator 30 forms a part of lever 27 and is clearly visible through window 29, thereby providing an accurate indication of the current temperature setting which is accessible to people with reduced vision.

A subbase 15 carries large lettering at 17 and 18 for indicating which of the various operating modes have been selected by the positions of slide switches 23 and 24. A baseplate 16 carries further legends and also status indicator lights 20 and 21. Cover 12 and baseplate 16 include cooperating detent elements which allow cover 12 to snap onto baseplate 16 in a way which securely mates them, but also allows cover 12 to be easily removed when desired. The surface of baseplate 16 also carries all of the functional elements of thermostat 10.

Figure 2:
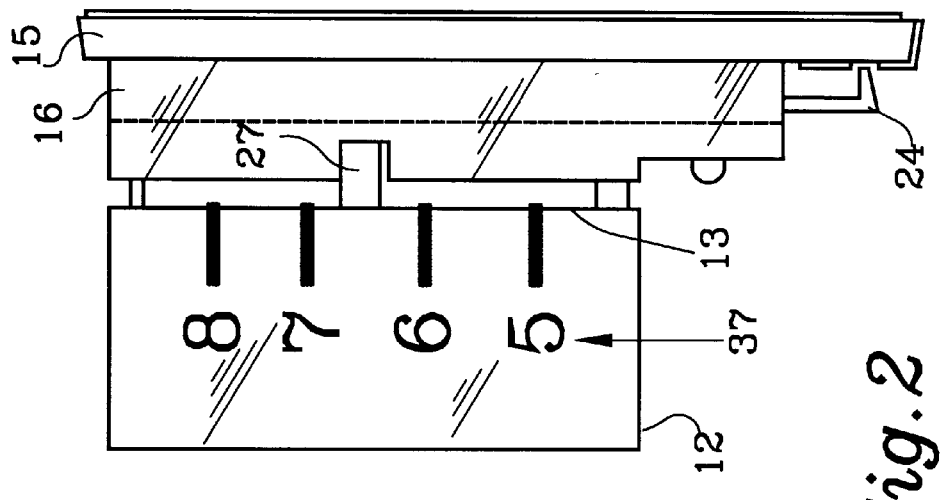
FIG. 2 is a side projective view of a thermostat incorporating the invention with the cover attached.

The side view of FIG. 2 shows another temperature scale with very large lettering to indicate the temperature at which lever 27 is currently set. Edge 13 of cover 12 is the presently preferred embodiment of one key feature of the invention, which I call a lever bias element. Edge 13 is in contact with lever 27 and continually urges the adjacent end of lever 27 toward the baseplate 16 surface.

FIG. 3 shows thermostat 10 with its cover 12 removed revealing generally at 45 and mounted on the surface of baseplate 16 the functional elements of the thermostat. It is unnecessary to discuss in great detail, the structure of thermostat 10 shown in FIG. 3 since most of these features have been well known and accepted for literally decades. It is only the features shown in FIG. 3 which pertain directly to the invention which are not well known by those having skill in the art. Suffice it to say that FIG. 3 shows mercury switching capsules 49 and 50 mounted on a first end 55 of a bimetal coil 47. A second end 56 of the bimetal coil is attached to a first end 60 of lever 27. Lever 27 is mounted for rotation on shaft 52 to provide lever 27 with a range of movement while sweeping across surface 42 of a baseplate 16. As lever 27 is rotated, the nominal angle of mercury switching capsules 49 and 50 changes, thereby changing the set point for thermostat 10. Features to provide other functions such as heat and air conditioning anticipation, cycle rate adjustment, etc. are also present but not germane to the invention.

The invention arises from the cooperation of three novel features shown in FIGS. 3 and 4. A first of these features is shown in FIG. 4 as a projection 62 from lever 27 toward baseplate surface 42. As lever 27 rotates, projection 62 sweeps along a preselected path 40 on surface 42 and shown in FIG. 3. The second of the features comprising the invention is a set of ridges 65 within path 40. Ridges 65 may be spaced bars transverse to path 40 or walls between individual pits or voids within path 40. In any case, the spacing between these adjacent ridges 65 should bear some logical relationship to temperature setting increments. For example, the spacing between adjacent ridges 65 may correspond to a 2° F. or 1° C. change in temperature setting for lever 27. Projection 62 and spaces between ridges 65 are designed to mate and form detents, so the shape of the individual spaces between ridges 65 and the shape and size of projection 62 should be compatible to achieve the detent function according to well known practice.

To assure an appropriate amount of force urging projection 62 toward ridges 65 and hence an appropriate operating force, a lever bias element is useful. There are a number of different arrangements possible for providing this function. This invention uses as its preferred embodiment the interaction between lever 27 and an edge 13 (see FIGS. 2 and 4) of cover 16 extending along the range of movement of lever 27 and in interfering contact with the lever 27 substantially along the dotted line area 28 shown in FIG. 3. To assist in visualizing this relationship, a portion of the projection of edge 13 onto baseplate 16 is shown at 19 between the dotted line segments. Lever 27 is formed of a material and with dimensions which create a certain level of resilience or flexibility in the area of lever 27 between area 28 and projection 62. (Recall that projection 62 is positioned on lever 27 to sweep along path 40 as lever 27 is rotated to different positions for different temperature settings.) When cover 12 is attached to baseplate 16, edge 13 assumes a spacing from surface 42 which deflects or interferes with lever 27 in the vicinity of area 28 so as to urge projection 62 toward path 40. This force creates the desired detent action between lever 27 and its projection 62 on the one hand, and the ridges 65 in path 40 on the other. This detent action creates a tactile feedback to the user allowing the user to easily sense the movement of lever 27 from one position to another. Hence the user can accurately adjust the temperature by feel alone using the raised letters of scale 37 along with the detent action in the movement of lever 27, so there is no need to see indicator 30 and scale 35 clearly or perhaps even at all.

FIGS. 5–7 disclose an alternative embodiment of the invention. FIG. 6 is a magnified cross section of the working elements of this alternative embodiment. In FIG. 6, detent ridges 68 are shown on the edge 13 of cover 12 with valleys 13a separating adjacent ridges. Lever 27 includes a projection 68 extending away from baseplate 16 and positioned to create the detents by engaging the ridges 73 and valleys 13a. A spacer projection 70 carried on arm 27 and in constant contact with a path 43 in surface 42 as lever 27 rotates on shaft 52, serves as the lever bias element in this embodiment. Projection 70 is positioned on lever 27 between axis 52 and projection 68 and maintains a constant spacing between lever 27 where projection 70 is attached, and the adjacent surface 42. This arrangement causes resilient deflection of arm 27 when cover 12 is mounted on baseplate 16, so that projection 68 is in constant contact with the adjacent ridges 73 and the valleys 13a between the ridges 73. As lever 27 rotates about its axis 52, projection 70 sweeps along path 43 while continually creating force urging projection 68 against ridges 73 and valleys 13a. This continual force creates the desired detent action as projection 68 falls into successive valleys 13a during the operation and positioning of lever 27.

Because it is not convenient to match the cross sectional shape of edge 13 to the arc through which projection 68 moves while lever 27 rotates, we instead angle ridges 68 and valleys 13a so as to align them with radii centered on the axis of shaft 52. This is illustrated in FIG. 7, which is a magnified edge-on view of the top and bottom ends of edge 13, with the viewer in essence looking down through the top of cover 12 to the ridges 73 and valleys 13a. In FIG. 7, the axis of shaft 52 lies far to the left of edge 13 and is not shown. The valleys 13a' and ridges 73' at the top part of edge 13 are shown angled slightly to place them in alignment with radii centered on the axis of the shaft 52. The valleys 13a" and ridges 73" on the bottom part of edge 13 are shown angled slightly in the opposite sense to place them also in alignment with radii centered on the axis of the shaft 52. In order to properly register each detent with a particular temperature setting, it is also necessary to change the width of individual ridges 73' and 73" so that lever 27 swings through an identical angle from one detent position to another.

The feature illustrated in these two embodiments is of course extremely useful for people who have impaired vision. However, it is also useful for people with normal vision in some circumstances. For example, if an occupant wishes to change a thermostat's temperature setting in the middle of the night, she may not want to turn on a light and become thoroughly awake. A thermostat such as just described allows this user to keep the lights at a very low setting or even completely off while adjusting the temperature setting.

It was mentioned that there are a number of embodiments which are available for practicing this invention. The two described are both compatible with pre-existing thermostat designs and avoid the need for a complete redesign of the unit. As one example of a possible variation requiring more extensive redesign of an existing thermostat, the edge 13 need not be integral with the cover 12, but instead could be a separate element or bracket forming a part of surface 42. Or the shaft 52 and lever 27 can be designed with sufficient rigidity to create adequate force either urging projection 62 toward path 40 or projection 68 toward edge 13 to create the detent action. In another version of the first embodiment, edge 13 need not be an outer edge of cover 12, but instead can be an edge of an internal projection carried on the inside of cover 12 and contacting lever 27 approximately midway between the rightmost end of lever 27 and the pivot point on shaft 52.

One can thus see that there are a number of different variations in details of this invention, all of which we wish to included as a part of it.

The embodiments of an invention in which an exclusive property or right is claimed are defined as follows:

1. In a thermostat having i) a baseplate having a surface, ii) an adjustment lever mounted for movement across the baseplate surface, and iii) a bimetal strip attached to the lever, the improvement comprising a projection extending from the adjustment lever toward the baseplate and sweeping along a preselected path on the baseplate surface during adjustment lever movement; on the baseplate surface, said path having a plurality of adjacent detent ridges therein; and a lever bias element contacting the adjustment lever and urging the adjustment lever toward the baseplate surface and the adjustment lever's projection into contact with the detent ridges.

2. The thermostat of claim 1, including a cover for attaching to the baseplate and for covering at least a portion of the adjustment lever, and wherein the adjustment lever has a resilient portion, the lever bias element comprising in said cover an edge of the cover extending along the range of movement of the adjustment lever and in interfering contact with the adjustment lever, said edge deflecting the resilient portion of the adjustment lever and urging the adjustment lever's projection toward the detent ridges.

3. The thermostat of claim 2, where the adjustment lever is adjacent to its first end mounted for rotation about an axis on the baseplate and wherein the adjustment lever carries the bimetal strip, wherein the preselected path follows an arc of a circle centered on the axis.

4. The thermostat of claim 3, wherein the adjustment lever has a resilient portion of its length adjacent to and spaced from the second end, wherein the lever's projection is between the resilient portion and the first end, and wherein the edge of the cover contacts the adjustment lever between the resilient portion and the second end thereof.

5. The thermostat of claim 1, wherein the adjustment lever is adjacent to its first end, mounted for rotation on the baseplate about an axis, and wherein the adjustment lever supports the bimetal strip, wherein the preselected path follows an arc of a circle centered on the axis.

6. In a thermostat having i) a baseplate having a surface, ii) an adjustment lever mounted for movement across the baseplate surface, iii) a bimetal strip attached to the adjustment lever, and iv) a cover for attachment to the baseplate and for covering at least a portion of the adjustment lever, the improvement comprising a) a first projection on the adjustment lever extending away from the baseplate;

b) an edge on the cover having a plurality of adjacent detent ridges thereon, said detent ridges sequentially facing the first projection on the adjustment lever as the adjustment lever moves across the baseplate surface; and c) a lever bias element contacting the adjustment lever and urging the adjustment lever toward the cover edge and the adjustment lever's first projection into contact with the detent ridges.

7. The thermostat of claim 6 wherein the lever bias element comprises in combination a resilient portion in the adjustment lever; a second projection on the adjustment lever extending from the adjustment lever toward the baseplate and contacting the baseplate surface, said second projection urging the adjustment lever away from the baseplate and the first projection and into interfering contact with the detent ridges on the cover's edge, and resiliently deflecting the resilient portion of the adjustment lever.

8. The thermostat of claim 7, wherein the adjustment lever is mounted for rotation on the baseplate about an axis, and wherein the detent ridges are separated by valleys therebetween, said ridges and valleys in alignment with radii of a circle centered on the adjustment lever's axis of rotation.

* * * * *